United States Patent
Konishi et al.

(10) Patent No.: US 9,979,922 B2
(45) Date of Patent: May 22, 2018

(54) LOW POWER CONSUMPTION DISPLAY DEVICE

(71) Applicant: CerebrEx, Inc., Osaka (JP)

(72) Inventors: Kenzo Konishi, Osaka (JP); Shinya Suzuki, Osaka (JP); Seisuke Morioka, Osaka (JP); Masahiro Kato, Osaka (JP)

(73) Assignee: CEREBREX, INC., Osaka (JP)

( * ) Notice: Subject to any disclaimer, the term of this patent is extended or adjusted under 35 U.S.C. 154(b) by 0 days. days.

(21) Appl. No.: 15/484,094

(22) Filed: Apr. 10, 2017

(65) Prior Publication Data

US 2017/0295343 A1    Oct. 12, 2017

(30) Foreign Application Priority Data

Apr. 12, 2016    (JP) .................................. 2016-079924

(51) Int. Cl.
*G09G 3/20* (2006.01)
*G09G 3/36* (2006.01)
(Continued)

(52) U.S. Cl.
CPC ............. *H04N 5/63* (2013.01); *G09G 3/2096* (2013.01); *G09G 5/003* (2013.01); *G09G 5/006* (2013.01);
(Continued)

(58) Field of Classification Search
CPC .... G02F 1/133; G09G 3/2096; G09G 3/3666; G09G 5/003; G09G 5/006; G09G 2310/04;
(Continued)

(56) References Cited

U.S. PATENT DOCUMENTS 5,706,290 A * 1/1998 Shaw .................... G06F 9/4887
                                                     348/586
2002/0041281 A1 * 4/2002 Yanagi ................. G09G 3/3648
                                                     345/212

(Continued)

FOREIGN PATENT DOCUMENTS

JP    A 2003-044011    2/2003
JP    A 2007-286807    11/2007
(Continued)

OTHER PUBLICATIONS seminarslides_vesastandard_07jun16.pdf—VESA DisplayPort Seminar presented Jun. 6-7, 2016 slides 1-7 evidencing knowledge in the art prior to the time of filing.*

*Primary Examiner* — Michael J Eurice
(74) *Attorney, Agent, or Firm* — Pyprus Pte Ltd

(57) ABSTRACT

A display device (2) includes a processor (13) that outputs drawing data and a timing controller (11) that outputs the drawing data input from the processor according to horizontal synchronization and vertical synchronization. When a still image region where drawing data has not been updated compared with a previous frame and a moving image region where drawing data has been updated compared with a previous frame are included in one frame, the processor transmits data update information, which is for specifying the position of the moving image region or a line including the moving image region, to the timing controller temporally earlier than drawing data of the line including the moving image region. The timing controller performs processing for lowering the frame rate of the still image region or processing for thinning out some of image lines of the still image region based on the data update information.

10 Claims, 13 Drawing Sheets

(51) Int. Cl.
*H04N 5/63* (2006.01)
*G09G 5/00* (2006.01)
*G02F 1/133* (2006.01)

(52) U.S. Cl.
CPC .......... *G02F 1/133* (2013.01); *G09G 3/3666* (2013.01); *G09G 2310/0213* (2013.01); *G09G 2310/04* (2013.01); *G09G 2310/08* (2013.01); *G09G 2320/103* (2013.01); *G09G 2330/021* (2013.01); *G09G 2340/0435* (2013.01); *G09G 2370/047* (2013.01); *G09G 2370/12* (2013.01)

(58) Field of Classification Search
CPC ....... G09G 2310/08; G09G 2310/0213; G09G 2320/103; G09G 2330/021; G09G 2340/0435; G09G 2370/12; G09G 2370/047; H04N 5/63
See application file for complete search history.

(56) References Cited

U.S. PATENT DOCUMENTS

| | | | | |
|---|---|---|---|---|
| 2002/0093473 A1* | 7/2002 | Tanaka | .................. | G09G 3/3648 345/87 |
| 2003/0020699 A1* | 1/2003 | Nakatani | ............... | G06F 3/1415 345/204 |
| 2003/0030607 A1* | 2/2003 | Kitagawa | ............. | G09G 3/2092 345/87 |
| 2003/0058229 A1* | 3/2003 | Kawabe | .................. | G09G 3/342 345/204 |
| 2003/0179172 A1* | 9/2003 | Miyachi | ................. | G09G 3/3648 345/89 |
| 2005/0104834 A1* | 5/2005 | Tsuchihashi | ......... | G09G 3/3614 345/96 |
| 2005/0253833 A1* | 11/2005 | Teshirogi | ............. | G09G 3/3648 345/204 |
| 2006/0160616 A1* | 7/2006 | Kato | ........................ | A63F 13/10 463/30 |
| 2006/0285847 A1* | 12/2006 | McCall | ............... | G06F 13/4068 398/73 |
| 2008/0079739 A1* | 4/2008 | Gupta | .................... | G09G 5/363 345/520 |
| 2008/0100636 A1* | 5/2008 | Lai | ........................... | G09G 5/39 345/546 |
| 2009/0135123 A1* | 5/2009 | Yamato | ................ | G09G 3/2007 345/94 |
| 2009/0237391 A1* | 9/2009 | Yanagi | .................... | G09G 5/18 345/213 |
| 2009/0278763 A1* | 11/2009 | Zeng | ..................... | G06F 3/1431 345/1.1 |
| 2009/0316047 A1* | 12/2009 | Sawada | .................... | H04N 5/57 348/569 |
| 2010/0254704 A1* | 10/2010 | Aoki | ...................... | H04B 10/40 398/45 |
| 2011/0102446 A1* | 5/2011 | Oterhals | ................. | G06T 11/40 345/545 |
| 2011/0249684 A1* | 10/2011 | Nagai | ................... | H04L 49/357 370/419 |
| 2012/0113170 A1* | 5/2012 | Igarashi | ..................... | G06F 3/14 345/694 |
| 2013/0027379 A1* | 1/2013 | Lee | ...................... | G09G 3/3618 345/212 |
| 2013/0106876 A1* | 5/2013 | Lee | .......................... | G06F 13/14 345/520 |
| 2014/0085276 A1* | 3/2014 | Jang | ...................... | G09G 3/2007 345/204 |
| 2014/0225851 A1* | 8/2014 | Saitoh | ...................... | G06F 3/041 345/173 |
| 2014/0232954 A1* | 8/2014 | Suzuki | ............... | G02F 1/13306 349/12 |
| 2014/0285505 A1* | 9/2014 | Nakanishi | ................. | G06T 1/20 345/545 |
| 2014/0368484 A1* | 12/2014 | Tanaka | ................. | G09G 3/3648 345/208 |
| 2015/0116247 A1* | 4/2015 | Inoue | .................... | G06F 3/0416 345/173 |
| 2015/0317938 A1* | 11/2015 | Fujioka | ................. | G09G 3/2092 345/212 |
| 2015/0340014 A1* | 11/2015 | Kim | ........................ | G09G 5/18 345/212 |
| 2016/0086565 A1* | 3/2016 | Ryu | ......................... | G09G 5/003 345/211 |
| 2016/0163254 A1* | 6/2016 | Lee | .......................... | G06T 1/60 345/545 |

FOREIGN PATENT DOCUMENTS

| | | |
|---|---|---|
| JP | WO 2012/067073 A1 | 5/2012 |
| JP | WO 2013/115088 A1 | 8/2013 |
| JP | A 2013-213913 | 10/2013 |
| JP | WO 2014/045749 A1 | 3/2014 |
| JP | A 2014-186196 | 10/2014 |

* cited by examiner

FIG. 2
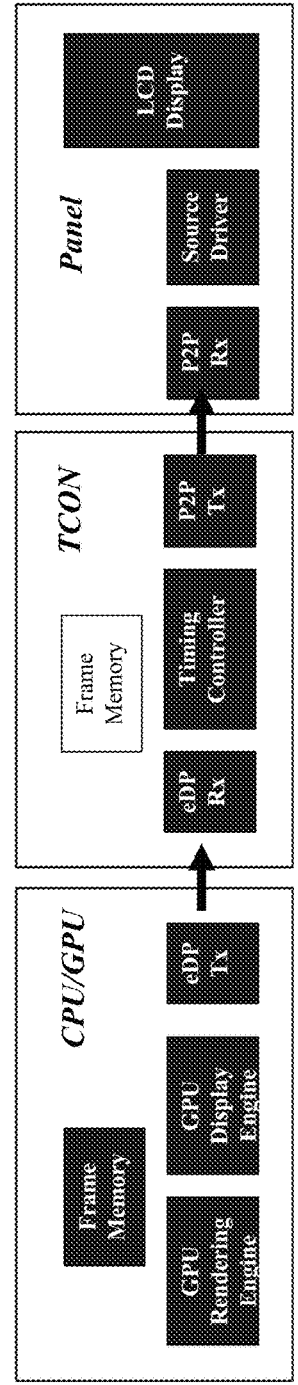
DURING NORMAL OPERATION
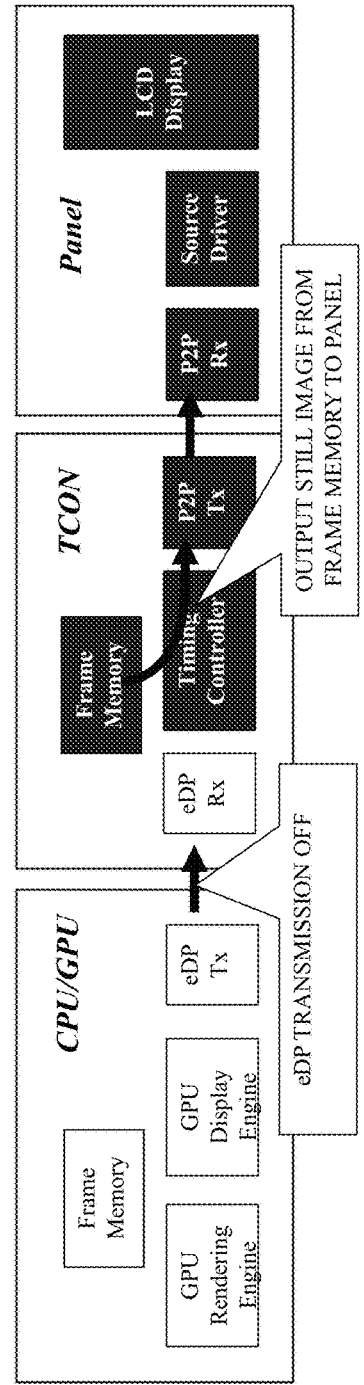
DURING PSR, DURING STILL IMAGE DRIVING OF PSR2

FIG. 4
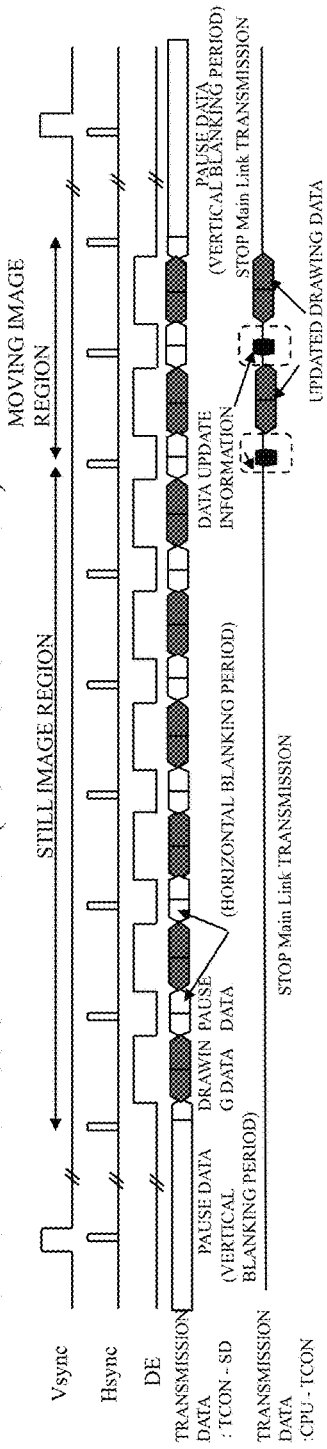
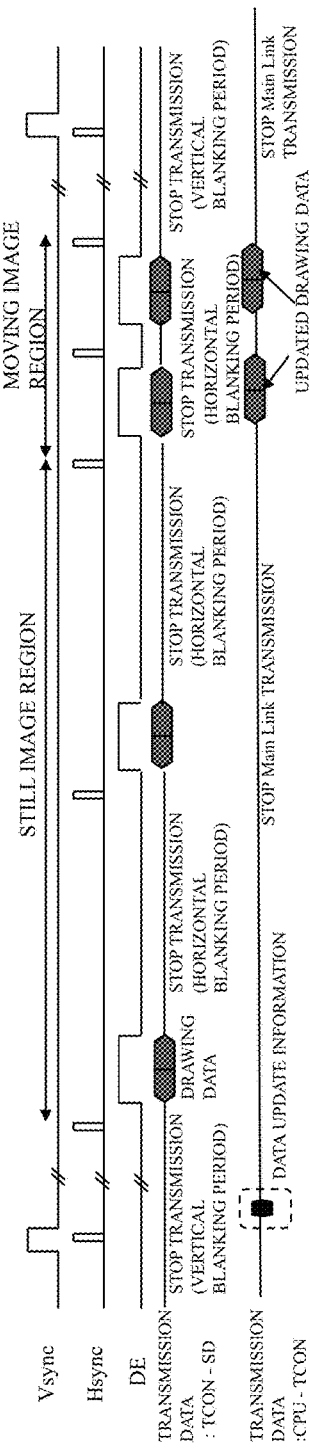

FIG. 9
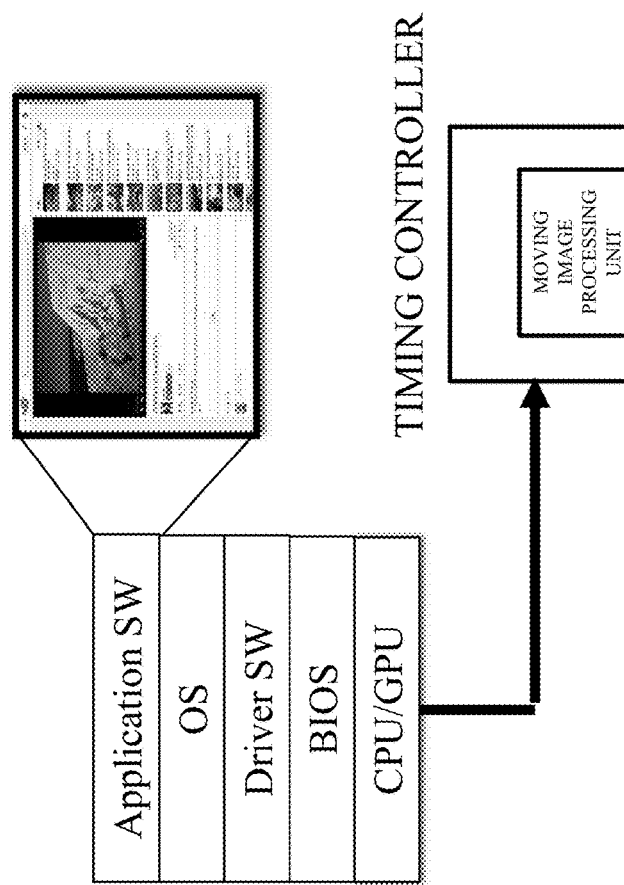
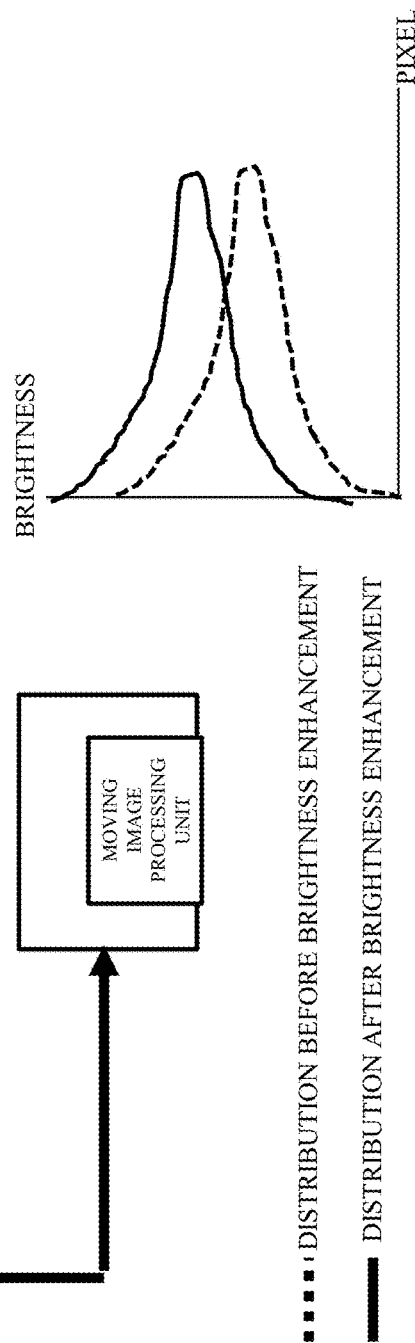

FIG. 11
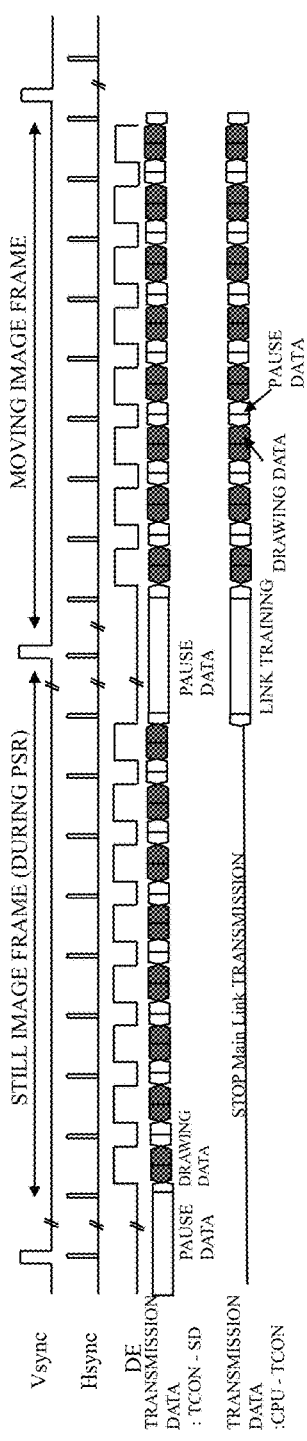
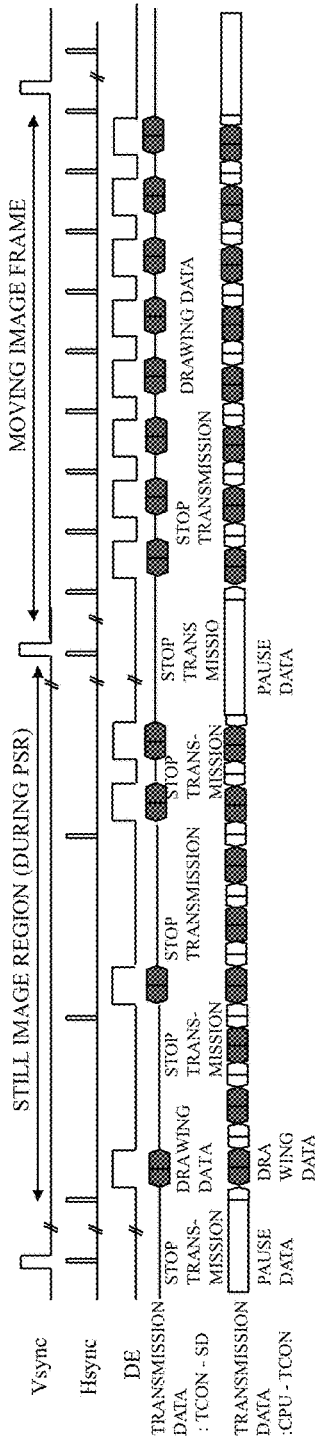

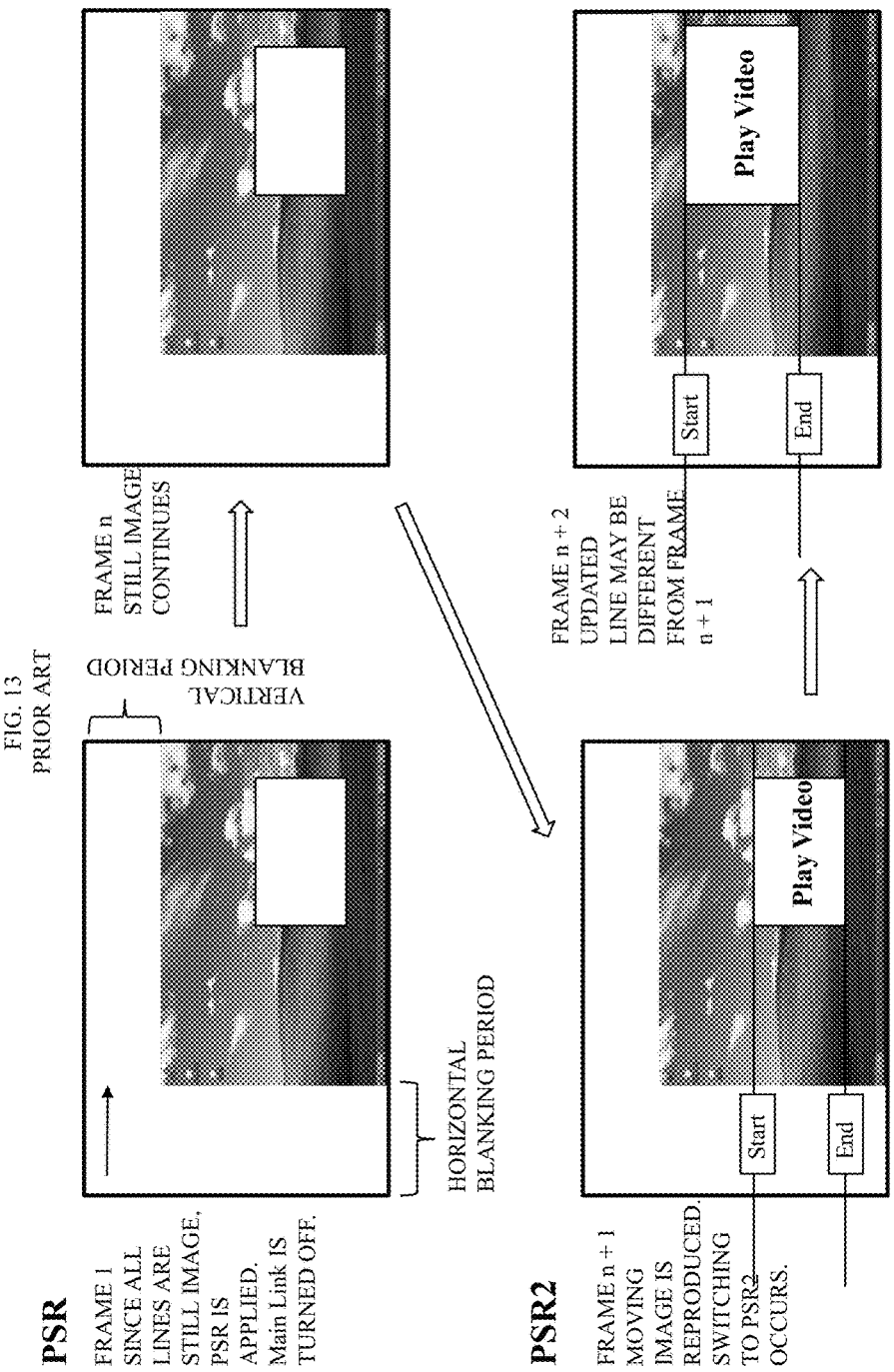

LOW POWER CONSUMPTION DISPLAY DEVICE

BACKGROUND

Technical Field

The present invention relates to a low power consumption display device for transmitting the drawing data of an image to a liquid crystal panel module.

Related Art

In mobile devices such as notebook computers, increasing the battery driving time by reducing power consumption greatly improves the added value of the products. For this reason, each company that manufactures mobile devices is focusing on measures to reduce power consumption. In addition, since the amount of data processing and the frequency have increased steadily with an improvement in the resolution of a panel, power consumption is a big problem. Therefore, for example, in a notebook computer, when drawing data of an image is transmitted to a timing controller of a panel from a processor, such as a Central Processing Unit (CPU) or a Graphics Processing Unit (GPU), Low Voltage Differential Signaling (LVDS) has been widely used in the related art. In recent years, however, an embedded Display Port (eDP) defined by the Video Electronics Standard Association (VESA) is mainly adopted.

Under the eDP standard, a Panel Self Refresh (PSR) function is supported. The PSR is a function of reducing the power consumption of the system by stopping the transmission of drawing data from the processor to the timing controller and driving the panel module using the frame memory on the timing controller side when there is no change in the drawing data for a predetermined period on a frame basis. In the eDP, a Panel Self Refresh-2 (PSR2) function is supported. The PSR works effectively when there is no change in drawing data over the entire one frame. On the other hand, the PSR2 is a function of reducing the power consumption of the system by stopping the transmission of drawing data from the processor to the timing controller on a line basis for a still image region (region where there is no change in drawing data) and driving the panel module using the frame memory on the timing controller side even when the still image region is present only in a part of one frame. In addition, in the PSR2, for a region where there is a change in drawing data (moving image region), the drawing data is transmitted from the processor to the timing controller through the eDP as usual.

Specifically, FIG. 13 conceptually illustrates the operations of general PSR and PSR2. First, in a frame [1], since there is no change in drawing data compared with the previous frame, it can be determined that the entire frame (all lines) is a still image. In this case, a PSR mode is applied. In the PSR mode, a main signal line (Main Link) connecting the processor and the timing controller to each other is turned off, so that the transmission of the drawing data from the processor to the timing controller is stopped. In a subsequent frame [n], as long as the drawing data is not updated, the timing controller reads the drawing data from the frame memory mounted therein and transmits the drawing data to the panel module. Then, in a frame [n+1], it is assumed that the drawing data is updated in a part of the frame and a moving image is reproduced. In this case, a PSR2 mode is applied. In the PSR2 mode, within a horizontal blanking period immediately before a line including a moving image region, information indicating that the moving image region starts in the next line, for example, the line number of the line including the moving image region, is transmitted from the processor to the timing controller. When the start information of the moving image region is received, the timing controller receives the drawing data from the processor and outputs the drawing data to the panel module, instead of reading the drawing data from the frame memory, in the line including the moving image region. In addition, information indicating the end of the moving image region is also transmitted from the processor to the timing controller within a blanking period immediately before the last line of the moving image region. When the end information of the moving image region is received, the timing controller reads the drawing data from the frame memory and outputs the drawing data to the panel module, instead of receiving the drawing data from the processor, from the next line. In addition, in a frame [n+2], the size or the position of a moving image region may be different from that in the frame [n+1].

In addition, in a tablet terminal or the like, Mobile Industry Processor Interface Alliance (mipi)-Digital Serial Interface (DSI) having the same function as eDP is used as an interface between the processor and the timing controller. Also in the tablet terminal, since the amount of data processing and the frequency have increased steadily with an improvement in panel resolution, power consumption is a big problem. Similarly to the eDP, mipi is also widely used as replacement of LVDS.

As described above, the PSR or PSR2 is effective for reducing the power consumption on the processor (CPU/GPU) side. However, in order to support the PSR or PSR2, it is necessary to mount a frame memory in the timing controller on the panel side. During the PSR or PSR2, the timing controller needs to access the frame memory to read the drawing data of the still image region. Accordingly, there is a problem that the power consumption increases with the access to the frame memory.

In addition, in the PSR operation, since the entire one frame is a still image, the power consumption of the panel module can be reduced by lowering the refresh rate of the panel during the PSR. For example, at the time of normal operation, the frame rate of 60 Hz can be dropped to 40 Hz or the like during the PSR. For example, WO 2014/045749 A1 discloses a technique of lowering the frame rate during the PSR.

However, in the PSR2 operation, as illustrated in FIG. 13, a region where drawing data is not updated (still image region) and a region where drawing data is updated (moving image region) are mixed in one frame. Therefore, it is difficult to lower the frame rate during the PSR2 operation with known techniques. For the same reason, it is difficult to thin out the number of lines or the number of frames during the PSR2 operation. Accordingly, the power consumption of the panel module is not reduced during the PSR2.

In addition, in the PSR2 operation, when updating the drawing data in the moving image region, the eDP transmission is restarted from the stopped state so that the updated drawing data is transmitted from the processor to the timing controller. Therefore, it is difficult to reduce the power consumption of the eDP transmission unit.

In addition, in the PSR and PSR2, since the timing controller always needs a frame memory as described above, there is a problem that electric power is consumed every time the panel module accesses the frame memory. In addition, there is also a problem of an increase in cost due to mounting the frame memory in the panel module.

Therefore, it is an object of the invention to provide a display device capable of reducing the power consumption of a liquid crystal panel module or the like including a timing controller. More specifically, the invention provides a display device capable of reducing the power consumption of a liquid crystal panel module or the like during the PSR2 operation.

SUMMARY

Basically, the invention is based on the finding that, if data update information for specifying a moving image region is transmitted from a processor to a timing controller temporally earlier than the drawing data of the moving image region during the PSR2 operation, the timing controller can specify a moving image region included in a frame based on the data update information and perform processing for lowering the frame rate or processing for thinning out some of image lines by thinning out some of drawing data in a still image region other than the moving image region. As a result, it is possible to reduce the power consumption of the timing controller and the display panel even during the PSR2 operation. Specifically, the invention has the following configuration.

The invention relates to a display device including a processor and a timing controller.

The processor is a CPU or a GPU, and is a control device for generating and outputting drawing data.

The timing controller is an integrated circuit that outputs the drawing data input from the processor according to horizontal synchronization and vertical synchronization. The timing controller can be connected to a source driver and a gate driver of a panel module. Here, when a still image region where drawing data has not been updated compared with a previous frame and a moving image region where drawing data has been updated compared with a previous frame are included in one frame, the processor transmits data update information, which is for specifying the position (range) of the moving image region or a line including the moving image region, to the timing controller temporally earlier than drawing data of the line including the moving image region. The timing controller specifies a region other than the moving image region, that is, a still image region, based on the data update information, and performs one or both of processing for lowering the frame rate of the still image region and processing for thinning out some of image lines of the still image region by thinning out some of the drawing data.

Here, "processing for lowering the frame rate of the still image region" and "processing for thinning out some of image lines of the still image region" will be described by way of examples. For example, a case is assumed in which 600 image lines form a still image region in a full HD display in which one frame includes 1080 image lines. In addition, it is assumed that the frame is updated 60 times per second (that is, the frame rate is 60 Hz).

In this case, the "processing for lowering the frame rate of the still image region" means lowering the frame rate, for example, from 60 Hz to 30 Hz by thinning out some of the drawing data (in particular, "frame" in this example) provided from the processor only for the 600 image lines that form the still image region. In short, the "processing for lowering the frame rate of the still image region" is processing for reducing the number of frames to be updated per second for the still image region.

On the other hand, the "processing for thinning out some of image lines" means reducing the number of image lines to be driven by thinning out image lines to be driven, only for 600 image lines that form a still image region in one frame formed by 1080 image lines. For example, for 600 image lines that form a still image region, driving of image lines is stopped at a ratio of one line to three lines, and only two lines out of three lines are driven. In this example, among 600 image lines that form a still image region, 200 image lines are stopped, and only 400 image lines are driven. In short, the "processing for thinning out some of image lines" is processing for stopping (thinning out) some of image lines that form a still image region.

In addition, since the processing for thinning out some of image lines can be performed by the timing controller, it is possible to perform processing for thinning out image lines in one frame on the timing controller side even if no drawing data is stored in the frame memory.

As in the configuration described above, prior to the line including the moving image region, information for specifying the moving image region is transmitted from the processor to the timing controller. Then, the timing controller can specify the still image region based on the information, and perform low power consumption processing, such as lowering the frame rate of the still image region. Accordingly, even during the PSR2 operation in which a still image region and a moving image region are mixed, it is possible to appropriately reduce the power consumption of the panel module.

In the invention, it is preferable that the processor transmits the data update information to the timing controller during a vertical blanking period temporally earlier than the moving image region. In addition, the vertical blanking period is a pause period in which drawing data is not transmitted until a certain frame switches to the next frame. That is, the vertical blanking period is a period from the end of scanning on scanning lines, which is performed from the top row to the bottom row of the screen in order to display one screen, to the start of displaying the next screen from the top row. The vertical blanking period is usually a period of about 500 μs to 1 ms. Thus, since the processor transmits the data update information to the timing controller within the vertical blanking period, the timing controller can sufficiently secure the time of processing for lowering the frame rate of the drawing data of the still image region or processing for thinning out the lines of the still image region within the frame. As a result, it is possible to efficiently reduce the power consumption.

In the invention, the data update information may include information regarding the number of a line in which drawing data has been updated. In this case, the processor can appropriately grasp a line (moving image line) including the moving image region and a line (still image line) including the still image region other than the moving image region.

In the invention, the data update information may include information regarding coordinates of apices of a moving image region where drawing data has been updated. In addition, since it is assumed that the moving image region is a rectangle, it is sufficient for the information regarding the apices of the moving image region to include the coordinate information of two apices positioned diagonally. In this manner, since the timing controller can grasp the position and range of the moving image region in detail, it is possible to widen a region where the frame rate is to be lowered. As a result, it is possible to further reduce the power consumption.

In the invention, the data update information may include information regarding a shape of a pointer image, which indicates a pointing position of a pointing device on a display screen, and information regarding a position of the pointer image before and after movement. There are many cases where only the pointer image is updated on the display screen operated by the user. Accordingly, by regarding the pointer image as a moving image region to lower the frame rate of a region other than the pointer image, it is possible to reduce power consumption.

In the invention, it is preferable that the processor and the timing controller are connected to each other by a main signal line for relatively high-speed operation for transmitting the drawing data and a sub-signal line for relatively low-speed operation for transmitting control data. In this case, when the data update information is only information regarding the shape of the pointer image and the position of the pointer image before and after movement, transmission of the drawing data through the main signal line is stopped, and the data update information is transmitted from the processor to the timing controller through the sub-signal line. In this manner, by stopping the transmission on the main signal line with high power consumption and by using the sub-signal line with low power consumption for transmission of the data update information, it is possible to reduce power consumption.

In the invention, the timing controller may include a frame memory capable of storing the drawing data input from the processor. In this case, the timing controller reads drawing data of the still image region from the frame memory and outputs the drawing data, and outputs drawing data of the moving image region without storing the drawing data input from the processor in the frame memory. Therefore, when outputting the drawing data of the still image region, transmission between the timing controller and the processor can be completely stopped. As a result, it is possible to reduce power consumption on the processor side.

In the invention, the timing controller may determine whether the input drawing data belongs to the still image region or the moving image region based on the data update information, and perform processing for lowering a frame rate of the still image region or processing for thinning out some of image lines of the still image region by thinning out some of the drawing data without storing the drawing data in a frame memory. In this case, it is not necessary to mount a frame memory in the timing controller. Therefore, it is possible to reduce the manufacturing cost of the timing controller.

In the invention, the timing controller may include a source driver individual control unit that individually controls whether or not to transmit drawing data to each of a plurality of source drivers. It is preferable that the source driver individual control unit controls each source driver so as to transmit drawing data to a source driver corresponding to a line including the moving image region and so as not to transmit drawing data to a source driver corresponding to a line including the still image region. In this manner, only the source driver corresponding to the moving image region requiring image updating is driven, and other source drivers that do not require image updating are paused. As a result, it is possible to reduce the power consumption of the panel module.

In the invention, it is preferable that the timing controller grasps an optimal Vcom setting value corresponding to a frame rate and controls the optimal Vcom setting value corresponding to the frame rate on a line basis when the frame rate is lowered. As described above, if the frame rate of the drawing data in the still image region is lowered, flicker noise often occurs on the display panel. The flicker noise is caused by a fluctuation in Vcom (common voltage of the liquid crystal panel) of the display panel. Therefore, the timing controller grasps an optimal Vcom setting value corresponding to the frame rate, and transmits the optimal Vcom setting value to the source driver as a command in accordance with a change in the frame rate. In this manner, it is possible to suppress the flicker noise generated in the display panel. However, when the frame frequency fluctuates, the Vcom potential fluctuates greatly even if the Vcom potential is adjusted on a frame basis. Therefore, in the invention, the timing controller (Vcom adjustment unit) grasps an optimal Vcom setting value corresponding to the frame rate, and controls the optimal Vcom setting value corresponding to the frame rate on a line basis when lowering the frame rate. Thus, it is preferable to suppress a fluctuation in Vcom potential on a line basis and transmit the optimal Vcom setting value to the source driver through the P2P transmission unit.

The timing controller may perform brightness enhancement processing on the moving image region or a line including the moving image region based on the data update information. In this manner, by enhancing the brightness of the moving image region, to which the user is paying attention, to individually brighten the moving image region, it is possible to appropriately display the moving image without consuming unnecessary power.

The invention can provide a low power consumption display device of a panel by improving a control method of a timing controller in a display module of a mobile device, such as a notebook computer or a tablet terminal. In particular, the invention can reduce the power consumption of a liquid crystal panel module or the like even during the PSR2 operation.

BRIEF DESCRIPTION OF DRAWINGS

FIG. 2 is a diagram illustrating PSR and PSR2 modes known as a technique for low power consumption on the processor side;

FIG. 4 is a timing chart illustrating a comparison between a known transmission method and a transmission method of the invention during the PSR2 period;

FIG. 9 is a diagram illustrating a function of a moving image processing unit;

FIG. 11 is a timing chart illustrating a comparison between a known transmission method and a transmission method according to a preferred embodiment of the invention during the PSR period;

FIG. 13 schematically illustrates operations in PSR and PSR modes in the related art.

DETAILED DESCRIPTION

Hereinafter, embodiments for carrying out the invention will be described with reference to the accompanying diagrams. The invention is not limited to the embodiments described below, but includes those appropriately modified from the following embodiments by those skilled in the art. In addition, in the invention, the respective embodiments described below can be appropriately combined, and each embodiment can be used independently. In addition, in the description of the embodiments of the invention, examples of eDP are described. However, the same effect can be obtained even if the eDP is replaced with the mipi, and the invention is not limited to the eDP.

[Basic Configuration of a Display Module]

Figure 1:
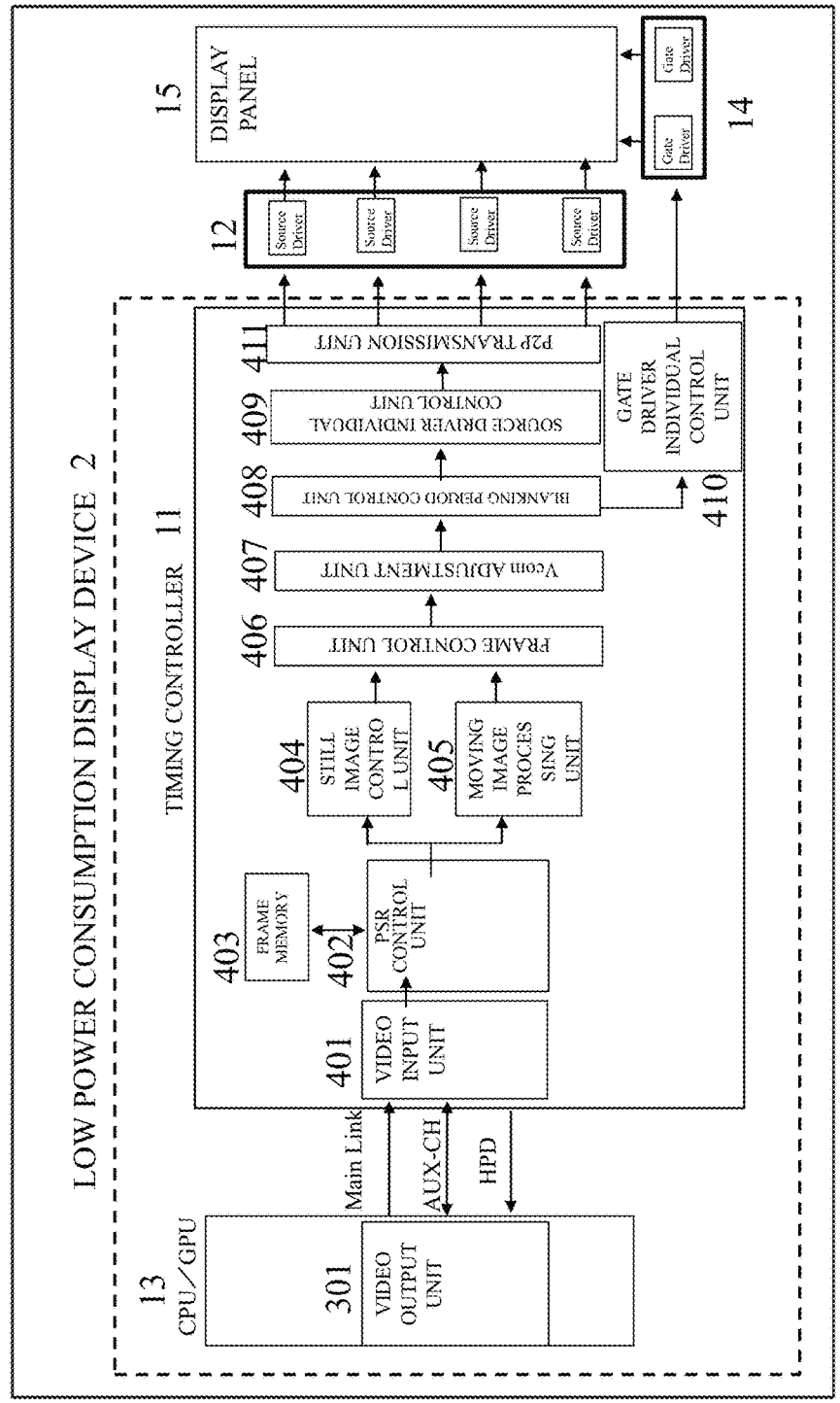
FIG. 1 is a block diagram illustrating the overall configuration of a display module including a display device according to the invention.

FIG. 1 is a block diagram illustrating the overall configuration of a display module 1 including a low power consumption display device 2 according to the invention. Here, the basic configuration of the display module 1 will be described with reference to FIG. 1.

As illustrated in FIG. 1, the display module 1 basically includes a timing controller 11 (TCON), a plurality of source drivers 12 (SD), and a processor 13 (a GPU or a CPU). In addition, the display module 1 may further include a gate driver 14 (GD), a display panel 15, and a flexible printed cable (FPC). The low power consumption display device 2 according to the invention includes at least the timing controller 11 and the processor 13 among these elements. However, in addition to these, the low power consumption display device 2 according to the invention may include the source driver 12, the gate driver 14, and the display panel 15.

The timing controller 11 is an integrated circuit (LSI: Large-Scale Integration) that generates various timing signals to match the timing of the display panel 15 in order to output drawing data generated by the processor 13 to the display panel 15. The timing controller 11 is connected to the source driver 12 and the gate driver 14, and performs control to drive these drivers according to horizontal synchronization and vertical synchronization. The timing controller 11 generates a control signal for transmitting video data to the source driver 12 according to a data enable signal (DE) (eDP signal) supplied from an external device, such as the processor 13. The data enable signal (DE) includes an effective period and a blanking period, and the effective period and the blanking period are periodically repeated.

The source driver 12 is a driver IC for driving the display panel 15, and is an element for driving data lines in the row direction. That is, the source driver 12 is connected to a plurality of source lines that form a display panel. Accordingly, the source driver 12 can drive the plurality of source lines of the display panel by receiving the video data and the start signal in the row direction from the timing controller 11.

The processor 13 is a control device that generates drawing data of an image to be displayed on the display panel 15 and transmits the drawing data to the timing controller 11. An example of the processor 13 is a CPU or a GPU. The processor 13 has a video output unit 301 that outputs drawing data. The video output unit 301 is connected to a video input unit 401, which is provided in the timing controller 11, by a plurality of signal lines (Main Link, AUX-CH, and HPD). The processor 13 is disposed, for example, on the main body side of a notebook computer, is in charge of various kinds of arithmetic processing and graphics processing, and determines whether or not there is a change in the drawing data of the entire frame. In addition, the processor 13 can distinguish a region where there is no change (still image region) from a region where there is a change (moving image region) in one frame. When there is no change in the entire one frame for a predetermined period, the processor 13 determines switching to the PSR. In addition, the processor 13 distinguishes a still image region and a moving image region in one frame, and determines switching to the PSR2. In addition, the processor 13 has, for example, a VESA-specified eDP output as a video output port, and transmits the drawing data of an image to the timing controller 11 through the main signal line (Main Link) and transmits control data other than the drawing data to the timing controller 11 through the sub-signal line (AUX-CH). In addition, it is also possible to adopt mipi output instead of the eDP output.

The gate driver 14 is a driver IC for driving the display panel 15, and is an element for driving data lines in the column direction. That is, the gate driver 14 is connected to a plurality of gate lines that form the display panel 15. Accordingly, the gate driver 14 can drive the plurality of gate lines of the display panel 15 by receiving the start signal in the column direction from the timing controller 11.

Here, operations of Panel Self Refresh (PSR) and Panel Self Refresh 2 (PSR2) that operate on the embedded Display Port (eDP) will be described with reference to FIG. 2. As illustrated in FIG. 2, during normal operation, drawing data is transmitted from the processor 13 (CPU/GPU) to the timing controller 11 (TCON) through eDP transmission. On the other hand, when there is no change in the drawing data for a predetermined period over the entire one frame, switching to the PSR mode occurs. In the PSR mode, when there is no change in the drawing data for a predetermined period over the entire one frame, the eDP transmission of the drawing data from the processor 13 to the timing controller 11 is stopped, the drawing data stored in the frame memory of the timing controller 11 is read from the frame memory, and the display panel 15 is driven. In this manner, in the PSR mode, it is possible to reduce the power consumption of the processor 13.

On the other hand, the PSR2 is a function corresponding to a case where a region where there is no change in drawing data (still image region) and a region where there is a change in drawing data (moving image region) are mixed in one frame. In the PSR2, the power consumption of the system is reduced by stopping the transmission of the drawing data from the processor 13 to the timing controller 11 on a line basis and driving the display panel 15 using the frame memory on the timing controller 11 side when drawing a still image region. In addition, in the PSR2, for a region where there is a change in the drawing data (moving image region), the drawing data is transmitted from the processor 13 to the timing controller 11 through the eDP as usual.

Subsequently, the functional configuration of the timing controller 11 will be described in more detail. As illustrated in FIG. 1, the timing controller 11 includes the video input unit 401, a PSR control unit 402, a frame memory 403, a still image control unit 404, a moving image processing unit 405, a frame control unit 406, a Vcom adjustment unit 407, a blanking period control unit 408, a source driver individual control unit 409, a gate driver individual control unit 410, and a P2P transmission unit 411.

The video input unit 401 is an element for receiving image data or the like, which is transmitted by eDP, from an external device, such as the processor 13. The video input unit 401 is, for example, a receiver unit conforming to the eDP standard of the VESA, and receives the drawing data of an image from the processor 13 through the main signal line (Main Link) and receives control data other than the drawing data from the processor 13 through the sub-signal line (AUX-CH). In the eDP standard, the main signal line (Main Link) is a high-speed differential serial line operating at a bit rate of minimum 1.62 Gbps to maximum 8.1 Gbps per differential lane. In contrast, the sub-signal line (AUX-CH) is a low-speed differential serial line operating at about 1 Mbps.

The PSR control unit 402 is an element for controlling the PSR mode and the PSR2 mode. First, when the processor 13 draws a still image for a predetermined period, a command of the PSR mode is transmitted from the processor 13 to the timing controller 11. When the command is received from the processor 13, the PSR control unit 402 starts controlling the PSR mode. Specifically, when the PSR mode is recognized, the PSR control unit 402 stores the frame data (drawing data) of the still image, which is a target of the PSR mode, in the frame memory 403. Then, the PSR control unit 402 reads the frame data stored in the frame memory 403 and drives the display panel 15 from the source driver 12, and stops the transmission from the eDP so that the processor 13 is in a standby state. Thus, in the PSR mode, the timing controller 11 itself rewrites the display panel 15 through the source driver 12 based on the frame data stored in the frame memory 403. For this reason, since it is not necessary to repeatedly transmit the frame data from the processor 13 to the timing controller 11, the processor 13 can be in the standby state. Therefore, by switching to the PSR mode, it is possible to reduce the power consumption of the entire display module (notebook computer or tablet terminal) including the processor 13. The same is true for the case of the PSR2 mode. When a still image region and a moving image region are mixed in one frame, the PSR control unit 402 stops the transmission of drawing data from the processor 13 to the timing controller 11 on a line basis and drives the display panel 15 using the frame memory on the timing controller 11 side when drawing the still image region.

The frame memory 403 is a temporary storage device, such as a RAM provided in the timing controller 11. As described above, drawing data (frame data) of an image to be displayed on the display panel is stored in the frame memory 403 from the timing controller 11 in the PSR mode or the PSR2 mode. However, even in the PSR mode, in a case where still image determination is performed on the timing controller 11 side based on the drawing data input from the processor 13 without stopping the eDP transmission, it is possible to remove the frame memory 403 or to stop the function of the frame memory 403. This will be described in detail later.

The still image control unit 404 is an element for determining whether the image input from the processor 13 is a still image or a moving image on the timing controller 11 side. The still image control unit 404 detects that the drawing data of the main signal line (Main Link), which is an eDP input, is a still image, and stops the transmission of the video data from the P2P transmission unit to the source driver until there is a change in the video data. As will be described in detail later, when it is determined that the image input from the processor 13 is a still image, the still image control unit 404 transmits the information to the frame control unit 406. The frame control unit 406 reduces power consumption by lowering the frame rate or performing a data thinning operation according to an instruction from the still image control unit 404. In addition, even when the timing controller 11 is connected to the processor 13 that does not support PSR, it is also possible to automatically switch to the PSR mode in the determination on the timing controller 11 side by providing the still image control unit 404 in the timing controller 11 and determining whether or not the image input from the processor 13 is a still image. In this case, it is possible to remove the frame memory 403 or to stop the function of the frame memory 403.

The moving image processing unit 405 is an element that, for example, in the PSR2 mode, when information regarding the apex coordinates of the rectangle of a moving image region is transmitted from the processor 13 to the timing controller 11, grasps the position of the moving image region based on the apex coordinates and performs specific image processing on only the moving image region within one frame. For example, the moving image processing unit 405 can perform brightness enhancement processing or the like on only the moving image region within one frame. By enhancing the image quality of only the moving image region to highlight the moving image region, it is possible to realize a liquid crystal panel with high commercial value.

The frame control unit 406 is an element for reducing power consumption by lowering the frame rate of drawing data or thinning out image lines at a predetermined rate from the original drawing data, for example, when the PSR control unit 402 determines that the current mode is the PSR mode or when the still image control unit 404 determines that the drawing data of the image input from the processor 13 is a still image. Specifically, it is preferable that, in the PSR mode and the PSR2 mode, the frame control unit 406 performs control to stop the transmission of at least two or more image lines, among a plurality of image lines to be transmitted from the P2P transmission unit to a plurality of source drivers, in a certain image frame. In this manner, when there is no change in the display image of the display panel, it is possible to reduce the power consumption of the display panel by lowering the frame rate or thinning out some of the image lines to be transmitted to a plurality of source drivers.

The Vcom adjustment unit 407 is an element that grasps an optimal Vcom setting value corresponding to the frame rate and controls the optimal Vcom setting value corresponding to the frame rate on a line basis when the frame rate is lowered. If the frame rate of the drawing data of the image is lowered, flicker noise is often generated on the display panel. The flicker noise is caused by a fluctuation in Vcom (common voltage of the liquid crystal panel) of the display panel. Therefore, the timing controller 11 grasps an optimal Vcom setting value corresponding to the frame rate, and transmits the optimal Vcom setting value to the source driver as a command in accordance with a change in the frame rate. In this manner, it is possible to suppress the flicker noise generated in the display panel.

The blanking period control unit 408 is an element for reducing power consumption by stopping the transmission of data, which is to be transmitted from the timing controller 11 to the source driver 12, in a vertical blanking period and/or a horizontal blanking period.

The source driver individual control unit 409 is an element for individually controlling a plurality of source drivers 12 in drawing data transmission from the timing controller 11 to the source driver 12. For the same line as the previous line and/or the same frame as the previous frame, the source driver individual control unit 409 stops the transmission to the source driver 12 to reduce power consumption.

The gate driver individual control unit 410 is an element for individually controlling a plurality of gate drivers 14 in transmission of image data from the timing controller 11 to the gate driver 14. For example, for the control of writing into the display panel (LCD) from the gate driver 14, the gate driver individual control unit 410 generates a control signal for collectively writing a plurality of lines when the plurality of lines are the same data.

The P2P transmission unit 411 is an element for outputting the drawing data of an image and other pieces of command information from the timing controller 11 to the source driver 12 based on a P2P (Point-to-Point) method. Due to the P2P transmission unit 411, the timing controller 11 is connected to the source driver 12 in a P2P method. Accordingly, the operation speed of about 2 Gbps/lane can be achieved. The P2P method is a method of performing transmission by superimposing a clock and data. For example, when eight source drivers 12 and one timing controller 11 are provided, one source driver 12 and the timing controller 11 are connected to each other through only one lane. That is, the timing controller 11 of the invention is configured to transmit a clock signal and video data through one signal line by superimposing the clock signal and the video data instead of transmitting the clock signal and the video data to the source driver 12 through separate signal lines. In the P2P method, since there is no connection with other source drivers, for example, as in miniLVDS, it is possible to eliminate branching (stub) on the transmission path. In addition, in the P2P, the clock line is superimposed on the data line. Accordingly, since it is not necessary to consider the timing Skew of the clock and the data, it is possible to improve the transmission speed.

Subsequently, the characteristic functions of the display module 1, in particular, the low power consumption display device 2 according to the invention will be described.

[Low Frame Rate Function of a Still Image Region]

Figure 3:
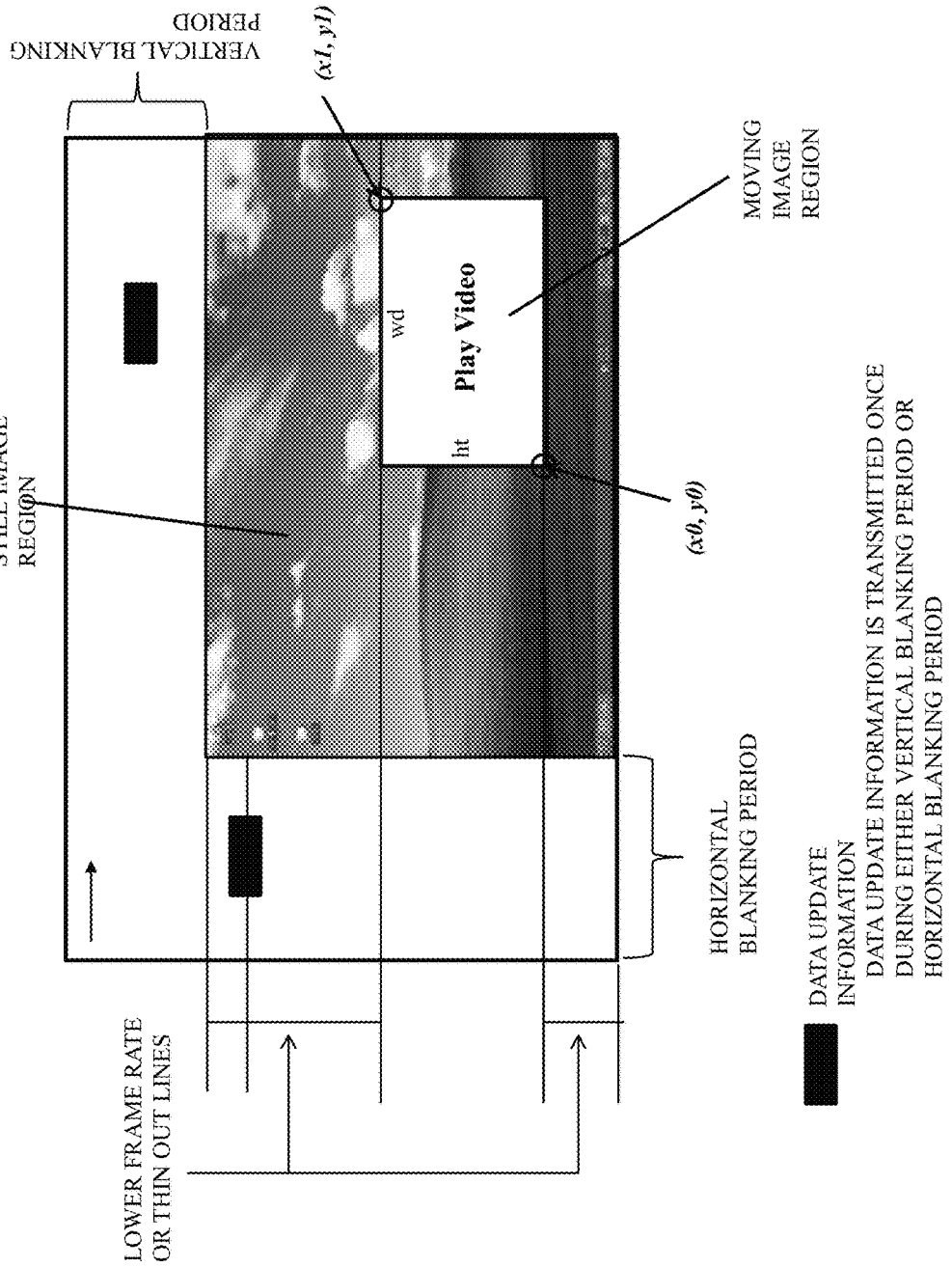
FIG. 3 schematically illustrates the operation of the display device according to the invention during the PSR2 period.

FIG. 3 conceptually illustrates the timing of transmitting data update information from the processor 13 to the timing controller 11 during the PSR2 mode. In addition, FIG. 4 is a timing chart illustrating a known transmission method and a transmission method of the invention during the PSR2 period. In addition, the known transmission method during the PSR2 period illustrated in FIG. 4 corresponds to the explanatory diagram of the PSR2 illustrated in FIG. 13.

As described above, in the known PSR2 mode, when a region where there is no change in drawing data (still image region) and a region where there is a change in drawing data (moving image region) are mixed in one frame, information of the line number (row number) of the line (moving image line) including the moving image region and the drawing data of the moving image region are transmitted from the processor to the timing controller by eDP. For other lines (still image lines) including the still image region, eDP transmission is stopped, and the panel is driven from the frame memory on the timing controller side through the source driver. In this manner, it is possible to reduce the power consumption of the system. In addition, as shown in the upper part of FIG. 4 and FIG. 13, in the PSR2 mode, the information of the line number (the number of lines) of the moving image line is transmitted during the horizontal blanking period immediately before the moving image line after entering the active region (screen display region) of the update frame. That is, in the known PSR2 mode, it is sufficient for the timing controller to be able to grasp the number of start lines and the number of end lines of the moving image line immediately before the moving image line. Accordingly, the processor also transmits the information of the line number of the moving image line to the timing controller during the horizontal blanking period immediately before the moving image line. However, if the information of the line number of the moving image line is transmitted from the processor to the timing controller during the horizontal blanking period immediately before the moving image line as in the known PSR2 mode, the timing controller can grasp the start and end of the moving image line, but there is a problem that it is not possible to secure time for performing processing for lowering the frame rate of drawing data or thinning out a part of drawing data for other still image lines. For this reason, in the known PSR mode, although it is possible to reduce the power consumption on the processor side, the power consumption reduction effect on the timing controller side and the display panel side cannot be obtained.

In the invention, therefore, as shown in the lower part of FIG. 3 and FIG. 4, in the PSR2 mode, when a moving image region and a still image region are included in one frame, information (data update information) for specifying the position of the moving image region or the line including the moving image region is transmitted from the processor to the timing controller at a timing temporally earlier than the horizontal blanking period immediately before the moving image line. By transmitting the data update information in advance from the processor to the timing controller in this manner, it is possible to secure processing time for lowering the frame rate of the drawing data of the still image region or thinning out some of the lines of the still image region in the timing controller. As a result, in the PSR2 mode, it is possible to reduce the power consumption on the timing controller side and the display panel side.

As the data update information, information of the line number (the number of lines) of the moving image line can be mentioned. The timing controller can specify the moving image line and the still image line by receiving the line number of the moving image line from the processor. Therefore, the timing controller can perform low power consumption processing, such as lowering the frame rate or thinning out some of lines, for the still image line.

In addition, as the data update information, information of the apex coordinates of a rectangular moving image region can be mentioned. If the coordinates of at least two diagonally positioned points are included as the apex coordinates of the moving image region, the timing controller can specify the rectangular moving image region. For example, in the example illustrated in FIG. 3, the lower left coordinates (x0, y0) and the upper right coordinates (x1, y1) of the moving image region are transmitted as data update information from the processor to the timing controller. However, as the apex coordinates of the moving image region, coordinates of all of the four positions of the rectangle may be included. By transmitting the information of the apex coordinates of the moving image region from the processor to the timing controller, the timing controller can specify the position of the moving image region in more detail. Therefore, the timing controller can perform low power consumption processing, such as lowering the frame rate or thinning out some of lines, for other still image regions. That is, since the timing controller can also perform low power consumption processing on the still image region in the moving image line, it is possible to further reduce the power consumption compared with the above-described case where the line number of the moving image line is transmitted.

As the timing of transmitting the data update information from the processor to the timing controller, a vertical blanking period immediately before entering the active region (screen display region) of one frame can be mentioned. That is, since the processor transmits the data update information to the timing controller within the vertical blanking period, the timing controller can perform low power consumption processing, such as lowering the frame rate or thinning out some of lines, for the entire still image region included in one frame. That is, the timing controller can start the low power consumption processing from the first line of the still image region by receiving the data update information within the blanking period before the start of the still image region within one frame. Therefore, it can be said that it is preferable to transmit the data update information within the vertical blanking period.

In addition, the timing of transmitting the data update information from the processor to the timing controller may be a horizontal blanking period that is temporally earlier than the horizontal blanking period immediately before the moving image line. Upon receiving the data update information at this timing, the timing controller can perform low power consumption processing, such as lowering the frame rate or thinning out some of lines, for the still image region until the moving image region starts after receiving the data update information. In addition, the data update information is transmitted once during the vertical blanking period or during the horizontal blanking period.

FIG. 4 illustrates a difference between the known transmission method and the transmission method of the invention during the PSR2 period. As illustrated in FIG. 4, in the transmission method of the invention, unlike in the known transmission method, data update information is transmitted from the processor to the timing controller during the vertical blanking period. In addition, in the transmission method of the invention, the timing controller performs processing for lowering the frame rate of drawing data, which is to be transmitted to the source driver, in the still image region. As a result, not only the reduction in power consumption on the processor side but also the reduction in power consumption on the timing controller side and the display panel side can be realized in the PSR2 mode of the invention, whereas only the reduction in power consumption on the processor side can be realized in the known PSR2 mode.

In addition, as illustrated in FIG. 4, in the transmission method of the invention, since the transmission of data from the timing controller to the source driver is completely stopped during the vertical blanking period and the horizontal blanking period, it is possible to reduce the power consumption of the display panel (LCD) by the control of the timing controller. Specifically, the timing controller extracts or generates a video synchronization signal based on the image signal input from the processor. For example, the video synchronization signal includes a horizontal synchronization signal (Hsync) for synchronously driving a plurality of source drivers, a vertical synchronization signal (Vsync) for synchronously driving a plurality of gate drivers, and a data enable signal (DE) including an effective period and a blanking period that are periodically repeated. Basically, the effective period and the blanking period correspond to the horizontal synchronization signal.

Here, as illustrated in FIG. 4, in the known transmission method, the timing controller transmits drawing data for displaying a video to each source driver within the effective period of the data enable signal (DE). In addition, the timing controller transmits pause data for pausing the display of the video to each source driver within the blanking period of the data enable signal (DE). As described above, the timing controller generally transmits video data including drawing data and pause data to each source driver at all times based on the data enable signal (DE). That is, in the known transmission method, the timing controller continues to apply a voltage to each source driver regardless of an effective period or a blanking period.

However, since the display of the video is paused during the blanking period, no image is displayed on the source line connected to the source driver. For this reason, if a voltage is applied from the timing controller to the source driver within the blanking period, electric power is wasted. Therefore, in the transmission method of the invention, as illustrated in FIG. 1, the blanking period control unit 408 is provided in the timing controller 11, and the transmission of video data including drawing data and pause data from the P2P transmission unit 411 to the source driver 12 is completely stopped during the blanking period based on the data enable signal. That is, the blanking period control unit 408 specifies a blanking period by analyzing the data enable signal, and completely cuts off the voltage applied from the P2P transmission unit 411 to the source driver 12 during the blanking period so that the transmission from the P2P transmission unit 411 to the source driver 12 is completely stopped. In addition, in the invention, as described above, the timing controller 11 and the source driver 12 are connected to each other based on the P2P type transmission method. Accordingly, cutting off the voltage applied from the timing controller 11 to the source driver 12 completely stops all transmissions including the transmission of clock signals as well as video data. As described above, in the invention, since the transmission of the video data and the clock signal is completely stopped while the transmission of the video data is stopped, it is possible to reduce the power consumption during this period to almost zero. As a result, the power consumption of the display panel can be reduced by stopping the image transmission during the blanking period on the timing controller 11 side.

In addition, as shown in the lower part of FIG. 4, the timing controller can set a period for stopping the transmission of video data not only during the vertical blanking period of the data enable signal (DE) but also during the horizontal blanking period of the data enable signal (DE), and can finely stop the transmission of data from the timing controller to the source driver. As a result, it is possible to more efficiently reduce the power consumption of the liquid crystal panel module. That is, the timing controller has a function of stopping the transmission of video data during both the vertical blanking period and the horizontal blanking period.

Figure 5:
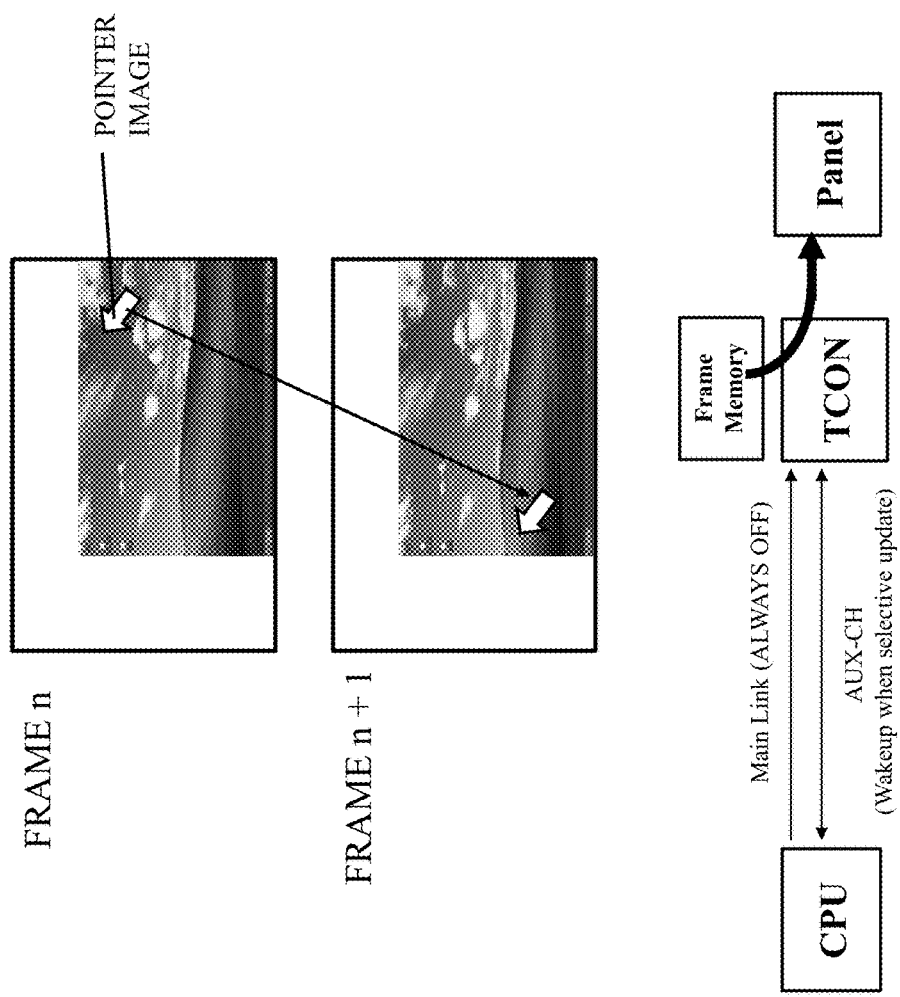
FIG. 5 illustrates an example of a PSR2 operation when only a pointer image moves.
Figure 6:
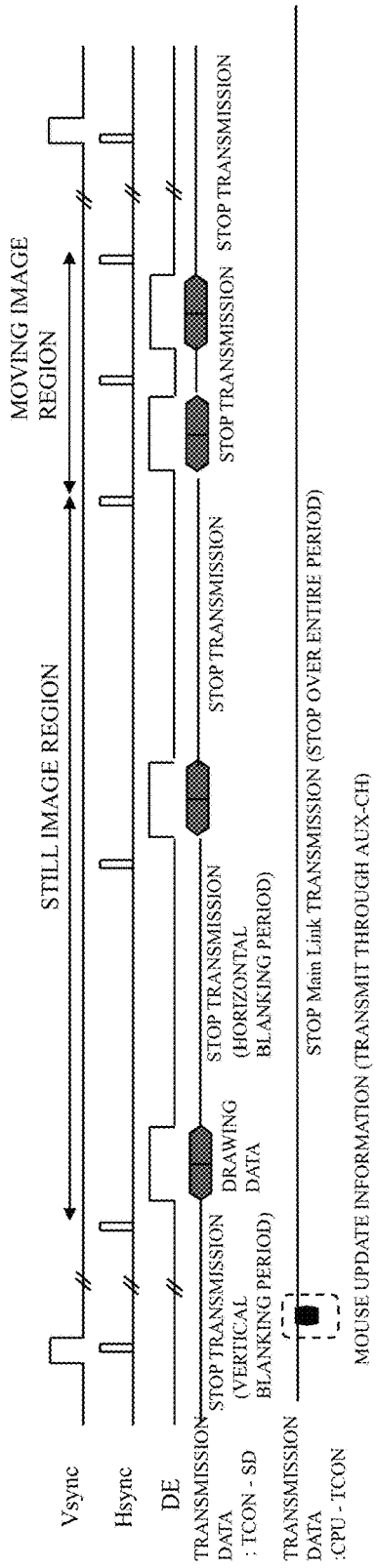
FIG. 6 is a timing chart illustrating a PSR2 operation when only a pointer image moves.

FIGS. 5 and 6 illustrate a case where the movement range of a pointer image indicating the pointing position of a pointing device on the display is regarded as the moving image region described above and low power consumption processing, such as lowering the frame rate, is performed on other still image regions. That is, there is a case where only a pointer image changes on the display screen and other regions are still image regions where there is no change in drawing data. In this case, the processor specifies the movement range of the pointer image as a moving image region, and transmits information (data update information) for specifying the position of the moving image region or the line including the moving image region from the processor to the timing controller at a timing temporally earlier than the horizontal blanking period immediately before the line including moving image region. In this case, the data update information includes information regarding the shape of the pointer image and information regarding the position of the pointer image before and after movement. Therefore, on the timing controller side, processing time for lowering the frame rate of drawing data outside the movement range of the pointer image, that is, the frame rate of drawing data of the still image region or thinning out some of the lines of the still image region is secured. As a result, in the PSR2 mode, it is possible to reduce the power consumption on the timing controller side and the display panel side.

In addition, in the PSR mode and the PSR2 mode, when updating the drawing data, it is common to transmit the updated drawing data from the processor to the timing controller by activating the transmission of the main signal line (Main Link) of eDP from the stopped state. However, when the pointer image frequently moves, power consumption for restarting the eDP transmission unit increases. Accordingly, it is difficult to reduce the power consumption on the processor side. In the transmission method of the invention, therefore, as shown in the lower part of FIG. 5, in the PSR mode and the PSR2 mode, when there is only a change of, for example, a pointer image on the screen, data update information (pointer image shape, position coordinates, and the like) of the pointer image is transmitted from the processor to the timing controller through the sub-signal line (AUX-CH) that is the low-speed line of eDP, and the timing controller reads and generates an image of the update information from the frame memory. That is, the shape of the pointer image is stored in the frame memory of the timing controller, and the timing controller generates an updated image of the pointer image. At this time, the main signal line (Main Link) that is the high-speed line of eDP is always turned off. As described above, by using the sub-signal line (AUX-CH) that consumes less electric power to transmit the data update information of the pointer image, it is possible to turn off the main signal line (Main Link) with high electric power consumption. As a result, it is possible to reduce the power consumption of the main signal line occupying the majority of eDP power consumption.

[Individual Control Function of a Source Driver]

Figure 7:
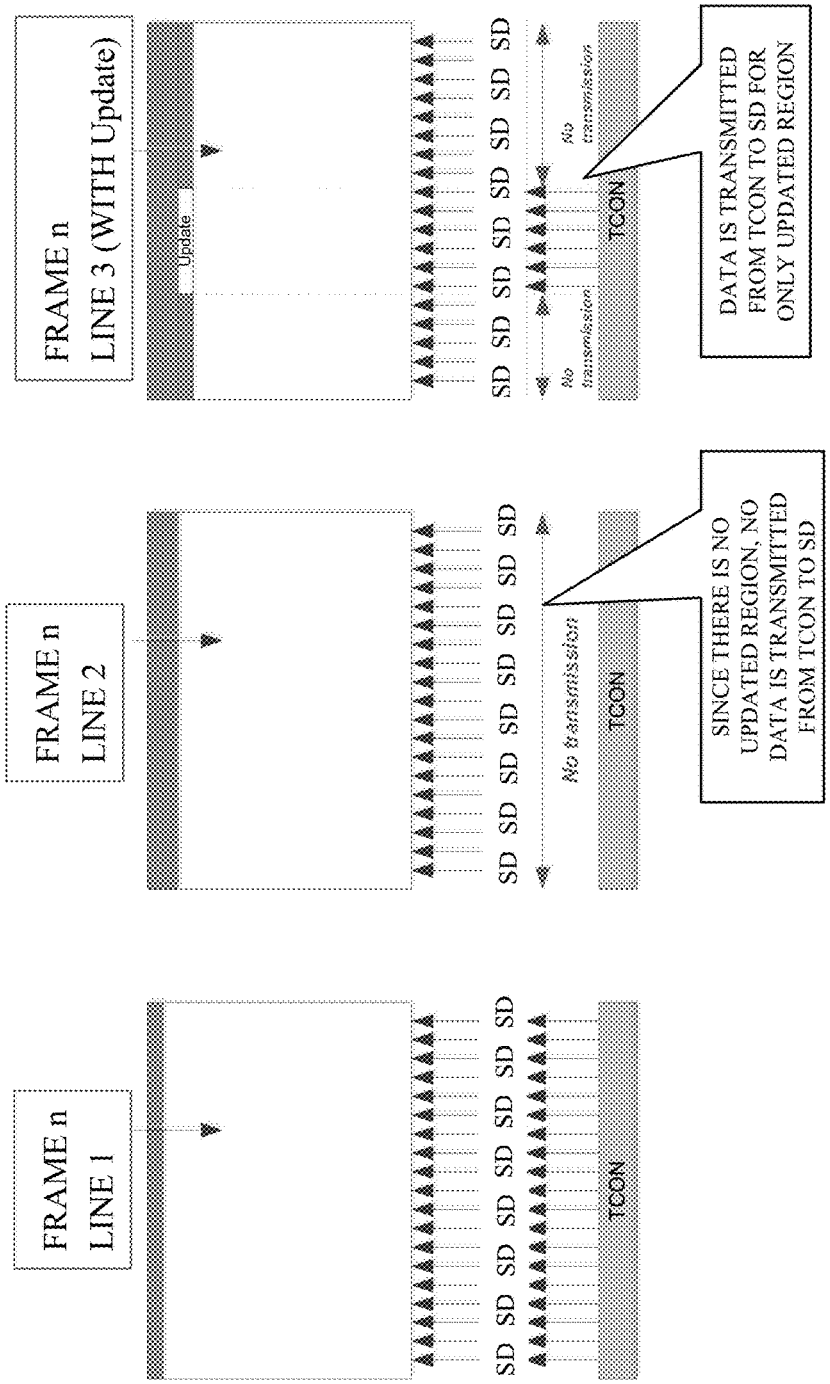
FIG. 7 is a diagram illustrating a function of a source driver individual control unit.

FIG. 7 illustrates a function of the source driver individual control unit provided in the timing controller. In the known PSR2 mode, since the source line of the display panel corresponding to a line without data update is also used to transmit drawing data from the timing controller to the source driver, wasteful power consumption occurs. In contrast, in the invention, the source driver individual control unit stops the transmission of data from the timing controller side to the source driver for the source line without data update, thereby being able to reduce power consumption.

That is, as illustrated in FIG. 7, the source driver individual control unit of the timing controller individually controls a plurality of source drivers to more finely perform power consumption reduction. For example, in the case of a 4K2K display panel, eight general source drivers are arranged. The timing controller is connected to each source driver based on the P2P (Point-to-Point) method. In addition, the source driver individual control unit of the timing controller has a P2P transmission unit that transmits video data to each of a plurality of source drivers, so that the transmission of video data is individually controlled for each source driver. By individually controlling a plurality of source drivers as described above, it is possible to more finely control data transmission, such as stopping individual transmission if image transmission is not required for a specific source driver. As a result, it is possible to reduce the power consumption of the display panel more accurately. In addition, the source driver individual control unit may perform processing, such as rearranging the image data order, in order to assign the image data received on the timing controller side to each source driver. In addition, when there is no change in image data for a specific source driver, the source driver individual control unit can also individually stop the transmission of an image to the source driver.

In addition, as described above, in the invention, data update information for specifying the position of the moving image line or the moving image region is transmitted from the processor to the timing controller during the PSR2 period. Therefore, the source driver individual control unit of the timing controller individually control a plurality of source drivers based on the data update information received from the processor. That is, it is preferable that the source driver individual control unit transmits drawing data to the source driver corresponding to the line including the moving image region and does not transmit drawing data to the source driver corresponding to the line including the still image region. In this manner, only the source driver corresponding to the moving image region requiring image updating is driven, and other source drivers that do not require image updating are paused. As a result, it is possible to reduce the power consumption of the panel module.

[Vcom Control Function]

By reducing the frame rate on the timing controller side during PSR or PSR2, it is possible to reduce the power consumption of the panel module. However, if the frame rate is lowered, flicker noise is often generated on the display screen. The flicker noise is caused by a fluctuation in Vcom (common voltage of the display panel) of the panel. Therefore, it is possible to suppress the flicker noise by appropriately controlling the Vcom voltage from the timing controller side.

Figure 8:
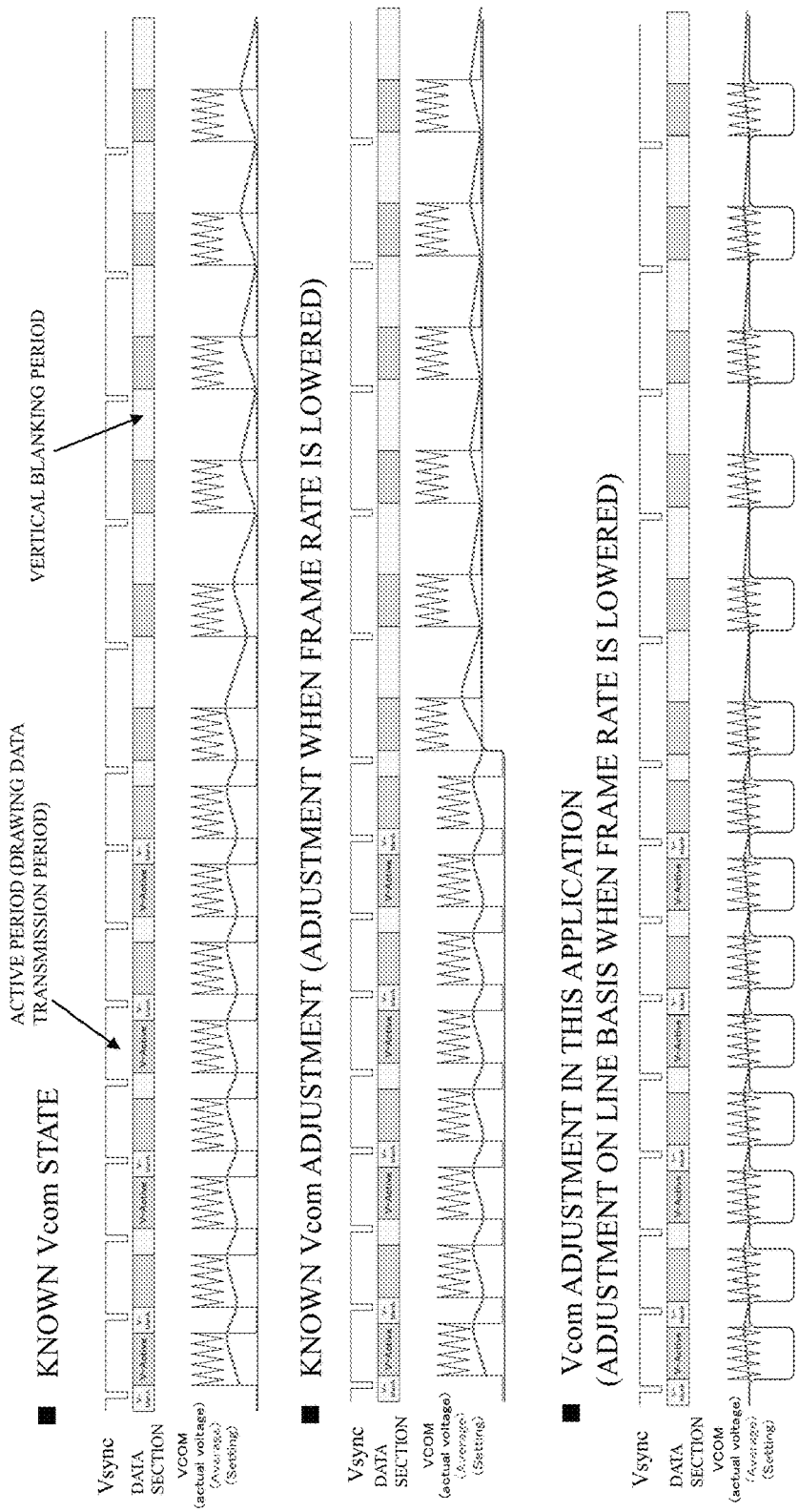
FIG. 8 illustrates an example of control of a Vcom potential according to the frame rate.

The upper part of FIG. 8 shows a Vcom state in the related art. On the timing controller side and the source driver side, the Vcom setting value is fixed ("Setting" line in FIG. 8), and the output side potential on the Vcom terminal side changes from frame to frame ("actual voltage" line in FIG. 8). Due to the large load capacity of the panel on the Vcom line, the averaged panel Vcom potential on the panel side fluctuates with a predetermined time constant ("Average" line in FIG. 8). In particular, as illustrated in FIG. 8, the Vcom potential decreases when shifting to the low frame rate. If the frame frequency fluctuates, the voltage fluctuates greatly even if Vcom is adjusted on a frame basis.

The middle part of FIG. 8 shows an example of Vcom control in the related art. When the frame rate is lowered, the setting value ("Setting" line of FIG. 8) of Vcom is increased in order to correct a voltage drop in Vcom in the upper part. In this manner, it is possible to maintain the same potential level as before the frame rate drop without lowering the averaged panel Vcom potential. However, as illustrated in FIG. 8, a large voltage fluctuation still occurs in the Vcom potential.

Therefore, the lower part of FIG. 8 shows a Vcom adjustment method in a preferred embodiment of the invention. Even if the Vcom value is adjusted on a frame basis as described above, a large fluctuation occurs in the Vcom potential. Accordingly, it is effective to adjust the Vcom setting value on a line basis. For example, the Vcom adjustment unit of the timing controller sets the Vcom setting value in the blanking period to a higher level ("Setting" line in FIG. 8) than that in the video active period (drawing data transmission period), thereby being able to reduce the noise level of the averaged Vcom potential. The above-described control is an example. In this application, since the Vcom setting value can be adjusted on a line basis, finer noise suppression becomes possible. The Vcom setting value is confirmed in advance by evaluation, and the Vcom adjustment unit of the timing controller transmits the setting value to the source driver for each line. Thus, Vcom setting is realized. The source driver controls the common voltage of the display panel based on the Vcom setting value received from the timing controller.

[Moving Image Region Brightness Enhancing Function]

FIG. 9 illustrates a function of the moving image processing unit provided in the timing controller. As described above, in the PSR2 mode of the invention, since the apex coordinates of the rectangle of the moving image region are transmitted from the processor to the timing controller, the timing controller can specify the position and range of the moving image region. Here, the moving image processing unit of the timing controller is an element for performing specific image processing only on the moving image region within one frame. The moving image processing unit can perform brightness enhancement processing or the like on the moving image region, for example. By enhancing the image quality of only the moving image region to highlight the moving image region, it is possible to realize a liquid crystal panel with high commercial value. Although the brightness enhancing function has been used in the display field from the past, it is not possible to enhance the brightness only for the moving image region. This is because the timing controller cannot grasp the coordinates of the moving image region in the related art. In contrast, in the invention, since the coordinates of the moving image region are transmitted from the processor to the timing controller, the moving image processing unit of the timing controller can perform brightness enhancement only on the moving image region included in one frame.

As illustrated in FIG. 13, in the processor, a lower layer than DriverSW exchanges information with the timing controller, but the OS or the application layer recognizes the coordinate information of the moving image region included in the frame. Therefore, in the processor, the OS or the application layer transmits the information of the apex coordinates of the moving image region to the timing controller through the lower layer than DriverSW. The moving image processing unit of the timing controller that has received the information of the apex coordinates of the moving image region can perform brightness enhancement processing only on the moving image region based on the apex coordinates of the moving image region.

[PSR•PSR2 Function without Using a Frame Memory]

Figure 10:
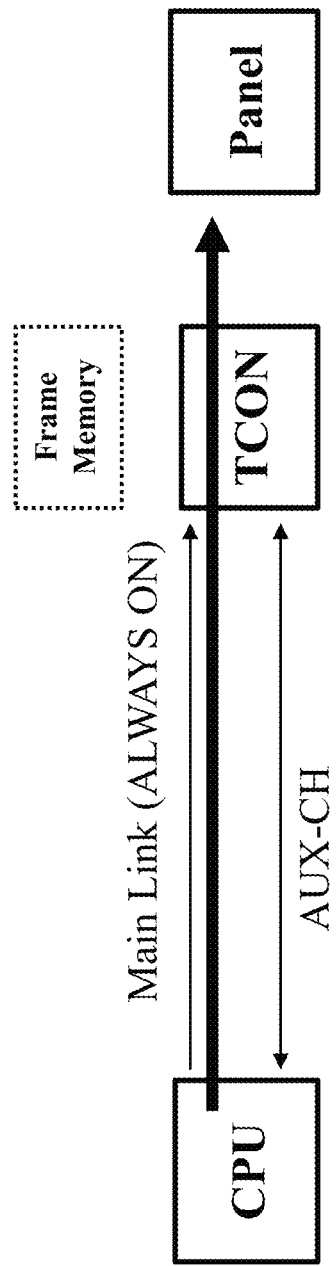
FIG. 10 schematically illustrates a transmission method of a processor and a timing controller when a frame memory is not used during the PSR/PSR2 period.
Figure 12:
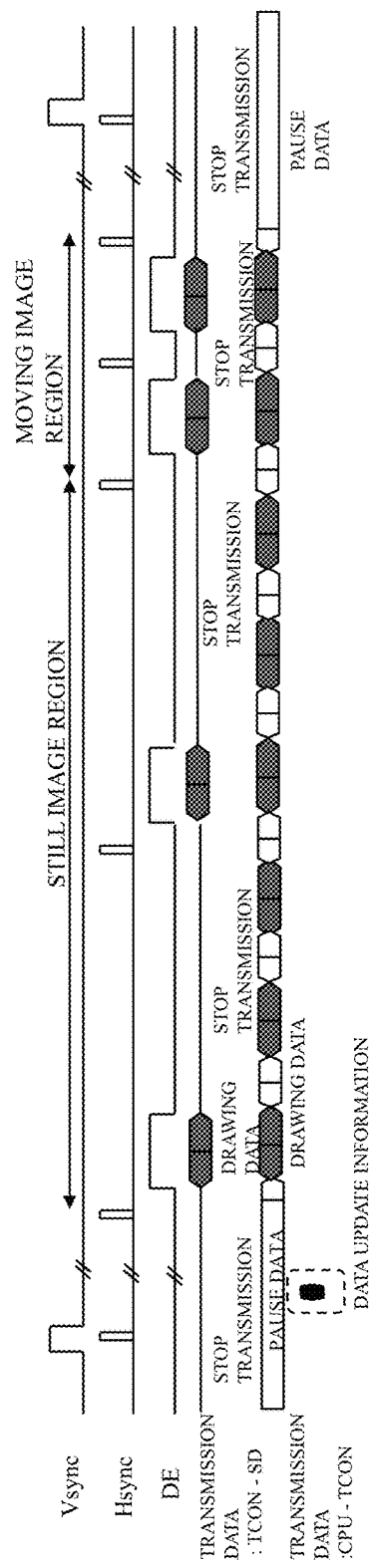
FIG. 12 is a timing chart illustrating a transmission method according to a preferred embodiment of the invention during the PSR2 period.

Next, a PSR mode and a PSR2 mode without using a frame memory will be described with reference to FIGS. 10 to 12. FIG. 10 is a block diagram illustrating a method of transmitting drawing data from the processor to the timing controller. FIG. 11 is a timing chart illustrating a comparison between a transmission method in the PSR mode in the related art and a transmission method in the PSR mode according to the preferred embodiment of the invention. In addition, FIG. 12 is a timing chart illustrating a transmission method in the PSR2 mode according to the preferred embodiment of the invention. In the known PSR and PSR2 modes, since the timing controller always needs to include a frame memory, it is a problem not only that the power consumption when accessing the frame memory increased, but also that the cost increases due to the mounting of the frame memory. Therefore, in the preferred embodiment of the invention, the same function as PSR and PSR2 is realized even if the frame memory of the timing controller is removed or stopped.

As illustrated in FIG. 10 and the lower part of FIG. 11, when the frame memory of the timing controller is not used during the PSR period, the transmission of the main signal line (Main Link) of eDP is always turned on so that the drawing data is always transmitted from the processor to the timing controller. Then, the still image control unit of the timing controller determines whether the drawing data input from the processor is a still image or a moving image. For example, the still image control unit compares the processing result of cyclic redundancy check (CRC) of the latest input frame (frame n) with the CRC processing result of the previous frame (frame n−1). If both the processing results are the same, it can be seen that the two frames are the same and there is no change in the image. Thus, the still image control unit can determine that the drawing data input from the processor is a still image. Then, as shown in the lower part of FIG. 11, when the still image control unit determines that the drawing data is a still image, it is possible to reduce power consumption on the panel side by lowering the frame rate or performing a thinning operation until a change occurs in the drawing data input from the processor. In addition, the still image control unit can reduce power consumption by stopping the transmission of video data from the P2P transmission unit to the source driver.

As illustrated in FIGS. 10 and 12, when the frame memory of the timing controller is not used during the PSR2 period, the transmission of the main signal line (Main Link) of eDP is always turned on so that the drawing data is always transmitted from the processor to the timing controller. Then, the still image control unit of the timing controller determines whether the drawing data input from the processor is a still image or a moving image. For example, the still image control unit can determine whether or not the drawing data input from the processor is a still image based on the data update information (the number of the moving image line or the apex coordinates of the moving image region) input from the timing controller. In addition, for example, the still image control unit can compare the processing result of cyclic redundancy check (CRC) of the line k of the latest input frame (frame n) with the CRC processing result of the line k of the previous frame (frame n−1). If both the processing results are the same, the still image control unit can determine that the two lines are the same and there is no change in the image. That is, the still image control unit determines whether or not the drawing data input from the processor is a still image based on the CRC processing results of the same lines of consecutive frames. Then, when the still image control unit determines that the drawing data is a still image, it is possible to reduce power consumption on the panel side by lowering the frame rate or performing a thinning operation until a change occurs in the drawing data input from the processor. In addition, the still image control unit can reduce power consumption by stopping the transmission of video data from the P2P transmission unit to the source driver.

In this manner, during the PSR period or the PSR2 period, by turning on the transmission of the drawing data from the processor to the timing controller at all times and determining whether the drawing data is a still image on the timing controller side, there is no need to mount a frame memory in the timing controller. In addition, even if a frame memory is mounted in the timing controller, it is not necessary to access the frame memory. As a result, even when the frame memory is removed or stopped, it is possible to realize the same function as PSR and PSR2 by providing a still image control unit in the timing controller. In addition, even during the PSR/PSR2 period, it is possible to remove the frame memory by determining whether or not the input drawing data is a still image on the timing controller side without stopping the eDP transmission. In this case, although the power consumption of the eDP part cannot be reduced, power consumption due to memory access can be reduced since no frame memory is required.

[PSR Control Function]

Next, the function of the PSR control unit will be described in more detail. The PSR control unit reduces the power consumption of the panel module by lowering the frame rate of the still image region during the PSR period or the PSR2 period. Specifically, when switching to the PSR mode is recognized, the PSR control unit of the timing controller reduces the power consumption of the panel module by lowering the frame rate of the drawing data in the still image region in real time. That is, as described above, it is possible to extract or generate video synchronization signals (Hsync, Vsync, and DE) on the timing controller side. The video synchronization signal includes a vertical synchronization signal (Vsync) for synchronously driving a plurality of gate drivers. The timing controller can change the frame rate by controlling the timing of the vertical synchronization signal. For example, by control on the timing controller side, the frame rate of video data is lowered from 60 Hz to 40 Hz.

For example, when a PSR mode start command is input from the processor to the timing controller, the PSR control unit may recognize that the PSR mode has started and lower the frame rate. In addition, the PSR control unit may analyze whether or not previous and later frames forming the video data are the same, recognize that the PSR mode has started when a period for which the frames are the same continues for a predetermined period or more, and lower the frame rate. By lowering the frame rate on the timing controller side, it is possible to reduce the power consumption of the panel module.

However, if the frame rate is lowered, flicker noise is often generated on the display screen. The flicker noise is caused by a fluctuation in Vcom (common voltage of the display panel) of the panel. When shifting to the low frame rate, voltage fluctuation occurs in Vcom. The voltage fluctuation depends on each panel. Therefore, it is preferable that the PSR control unit evaluates the frame rate and the amount of Vcom fluctuation in advance and determines an optimal Vcom setting value corresponding to the frame rate. When the frame rate is lowered when switching to the PSR mode, the PSR control unit transmits an optimal Vcom setting value corresponding to the lowered frame rate to the source driver as a command. Then, the source driver controls the common voltage of the display panel based on the Vcom setting value received from the PSR control unit of the timing controller. By transmitting the Vcom setting value from the timing controller to the source driver and controlling the source driver in real time by the timing controller as described above, it is possible to suppress flicker noise generated on the display panel.

In particular, when the frame frequency fluctuates, the Vcom potential fluctuates greatly even if Vcom is adjusted on a frame basis. Therefore, in the invention, as described above, the PSR control unit grasps an optimal Vcom setting value corresponding to the frame rate, and controls the optimal Vcom setting value corresponding to the frame rate on a line basis when lowering the frame rate. Thus, it is preferable to suppress a fluctuation in Vcom potential and transmit the optimal Vcom setting value to the source driver through the P2P transmission unit.

In this specification, in order to express the contents of the invention, the embodiments of the invention have been described with reference to the accompanying diagrams.

However, the invention is not limited to the above embodiments, but includes modifications and improvements obvious to those skilled in the art based on the matters described in this specification.

The invention can be appropriately used in the electrical equipment industry. In particular, the panel module of the invention can be appropriately used as a module for image communication built into a thin panel including a liquid crystal panel.

What is claimed is:

1. A display device, comprising:
    a processor that outputs drawing data; and
    a timing controller that outputs the drawing data input from the processor according to horizontal synchronization and vertical synchronization, wherein
    when a still image region where drawing data has not been updated compared with a previous frame and a moving image region where drawing data has been updated compared with a previous frame are included in one frame, the processor transmits data update information, which is for specifying a position of the moving image region or a line including the moving image region, to the timing controller during a vertical blanking period temporally earlier than the moving image region,
    the timing controller performs one or both of processing for lowering a frame rate of the still image region and processing for thinning out some of image lines of the still image region by thinning out some of the drawing data based on the data update information,
    the timing controller includes a frame memory capable of storing the drawing data input from the processor,
    drawing data of the still image region is read from the frame memory and is output, and
    drawing data of the moving image region is output without storing the drawing data input from the processor in the frame memory.

2. The display device according to claim 1, wherein the data update information includes information regarding the number of a line in which drawing data has been updated.

3. The display device according to claim 1, wherein the data update information includes information regarding coordinates of apices of a moving image region where drawing data has been updated.

4. The display device according to claim 1, wherein the timing controller includes a source driver individual control unit that individually controls whether or not to transmit drawing data to each of a plurality of source drivers, and
    the source driver individual control unit transmits drawing data to a source driver corresponding to a line including the moving image region, but does not transmit drawing data to a source driver corresponding to a line including the still image region.

5. The display device according to claim 1, wherein the timing controller grasps an optimal Vcom setting value corresponding to a frame rate, and controls the optimal Vcom setting value corresponding to the frame rate on a line basis when the frame rate is lowered.

6. The display device according to claim 1, wherein the timing controller performs brightness enhancement processing on the moving image region or a line including the moving image region based on the data update information.

7. The display device according to claim 1, wherein the data update information includes information regarding a shape of a pointer image, which indicates a pointing position of a pointing device on a display screen, and information regarding a position of the pointer image before and after movement.

8. The display device according to claim 7, wherein
the processor and the timing controller are connected to each other by a main signal line for relatively high-speed operation for transmitting the drawing data and a sub-signal line for relatively low-speed operation for transmitting control data, and
when the data update information is only information regarding the shape of the pointer image and the position of the pointer image before and after movement, transmission of the drawing data through the main signal line is stopped, and the data update information is transmitted from the processor to the timing controller through the sub-signal line.

9. A display device, comprising:
a processor that outputs drawing data; and
a timing controller that outputs the drawing data input from the processor according to horizontal synchronization and vertical synchronization, wherein
when a still image region where drawing data has not been updated compared with a previous frame and a moving image region where drawing data has been updated compared with a previous frame are included in one frame, the processor transmits data update information, which is for specifying a position of the moving image region or a line including the moving image region, to the timing controller during a vertical blanking period temporally earlier than the moving image region, and
the timing controller determines whether the input drawing data belongs to the still image region or the moving image region based on the data update information, and performs one or both of processing for lowering a frame rate of the still image region and processing for thinning out some of image lines of the still image region by thinning out some of the drawing data without storing the drawing data in a frame memory.

10. A display device, comprising:
a processor that outputs drawing data; and
a timing controller that outputs the drawing data input from the processor according to horizontal synchronization and vertical synchronization, wherein
when a still image region where drawing data has not been updated compared with a previous frame and a moving image region where drawing data has been updated compared with a previous frame are included in one frame, the processor transmits data update information, which is for specifying a position of the moving image region or a line including the moving image region, to the timing controller during a vertical blanking period temporally earlier than the moving image region,
the data update information includes information regarding a shape of a pointer image, which indicates a pointing position of a pointing device on a display screen, and information regarding a position of the pointer image before and after movement,
the processor and the timing controller are connected to each other by a main signal line for relatively high-speed operation for transmitting the drawing data and a sub-signal line for relatively low-speed operation for transmitting control data, and
when the data update information is only information regarding the shape of the pointer image and the position of the pointer image before and after movement, transmission of the drawing data through the main signal line is stopped, and the data update information is transmitted from the processor to the timing controller through the sub-signal line.

* * * * *